United States Patent
Ghosalkar et al.

(10) Patent No.: US 8,250,256 B2
(45) Date of Patent: Aug. 21, 2012

(54) METHODS, SYSTEMS AND COMPUTER PRODUCTS FOR USER-MANAGED MULTI-PATH PERFORMANCE IN BALANCED OR UNBALANCED FABRIC CONFIGURATIONS

(75) Inventors: Vishal V. Ghosalkar, San Jose, CA (US); Che Lui Shum, San Jose, CA (US); Stanley Y. Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/782,412

(22) Filed: Jul. 24, 2007

(65) Prior Publication Data

US 2009/0031057 A1 Jan. 29, 2009

(51) Int. Cl.
*G06F 3/00* (2006.01)
*G06F 5/00* (2006.01)

(52) U.S. Cl. ............... 710/38; 710/18; 710/40; 710/44
(58) Field of Classification Search .................. None
See application file for complete search history.

(56) References Cited

U.S. PATENT DOCUMENTS

| | | | |
|---|---|---|---|
| 5,521,909 A * | 5/1996 | Holloway et al. | 370/404 |
| 7,275,103 B1 * | 9/2007 | Thrasher et al. | 709/224 |
| 7,668,981 B1 * | 2/2010 | Nagineni et al. | 710/38 |
| 2002/0141345 A1 * | 10/2002 | Szviatovszki et al. | 370/238 |
| 2005/0080940 A1 * | 4/2005 | Flynn | 710/15 |
| 2005/0259632 A1 * | 11/2005 | Malpani et al. | 370/351 |
| 2007/0002748 A1 * | 1/2007 | Nakata et al. | 370/238 |

OTHER PUBLICATIONS

Multipath Management API, [online]; [retrieved on Jul. 20, 2007]; retrieved from the Internet http://www.t11.org/ftp/t11/admin/snia/04-649v0.pdf.

* cited by examiner

*Primary Examiner* — Henry Tsai
*Assistant Examiner* — Kris Rhu
(74) *Attorney, Agent, or Firm* — Cantor Colburn LLP; Feb Cabrasawan

(57) ABSTRACT

Methods, system and computer products for user-managed multi-path performance in balanced or unbalanced fabric configurations. Exemplary embodiments include a path priority selection method, including selecting a first I/O data path to be a highest priority path in a storage area network system, selecting a second I/O data path to be a low priority path, selecting an I/O threshold value, the I/O threshold value indicating that I/O data load is excessive, directing the load balance of I/O traffic to the first I/O data path, thereby placing the second I/O data path in a standby state, monitoring the first I/O data path, determining if the first I/O data path has reached the threshold value and performing a controlled failover of the first I/O data path to the second I/O data path when an I/O data load on the first data path has reached the threshold value.

21 Claims, 4 Drawing Sheets

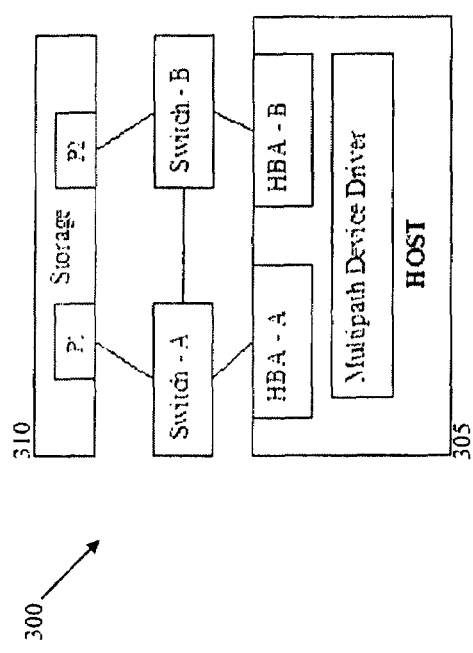
Fig. 3
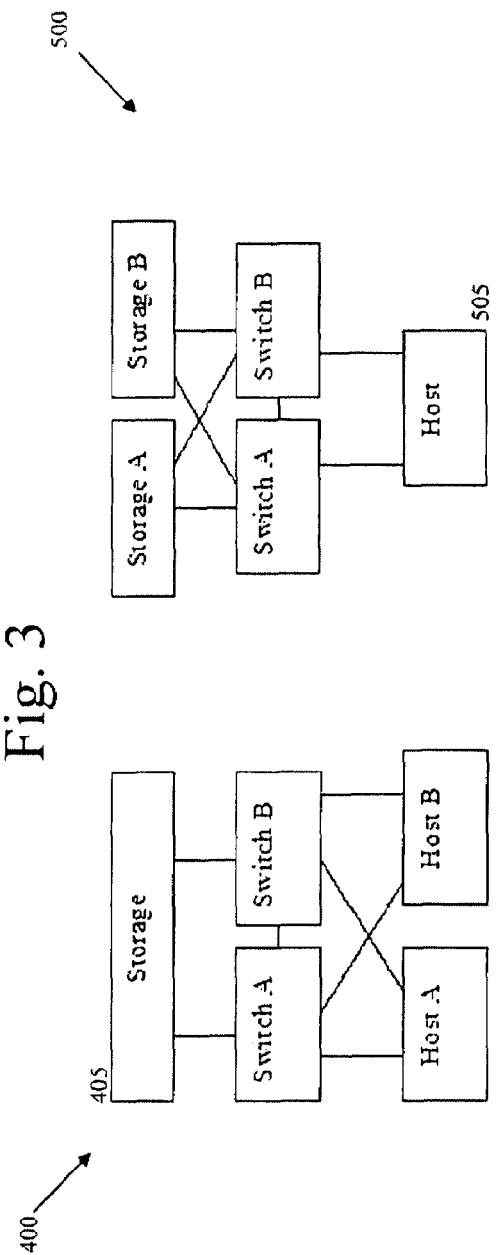
Fig. 5
Fig. 4

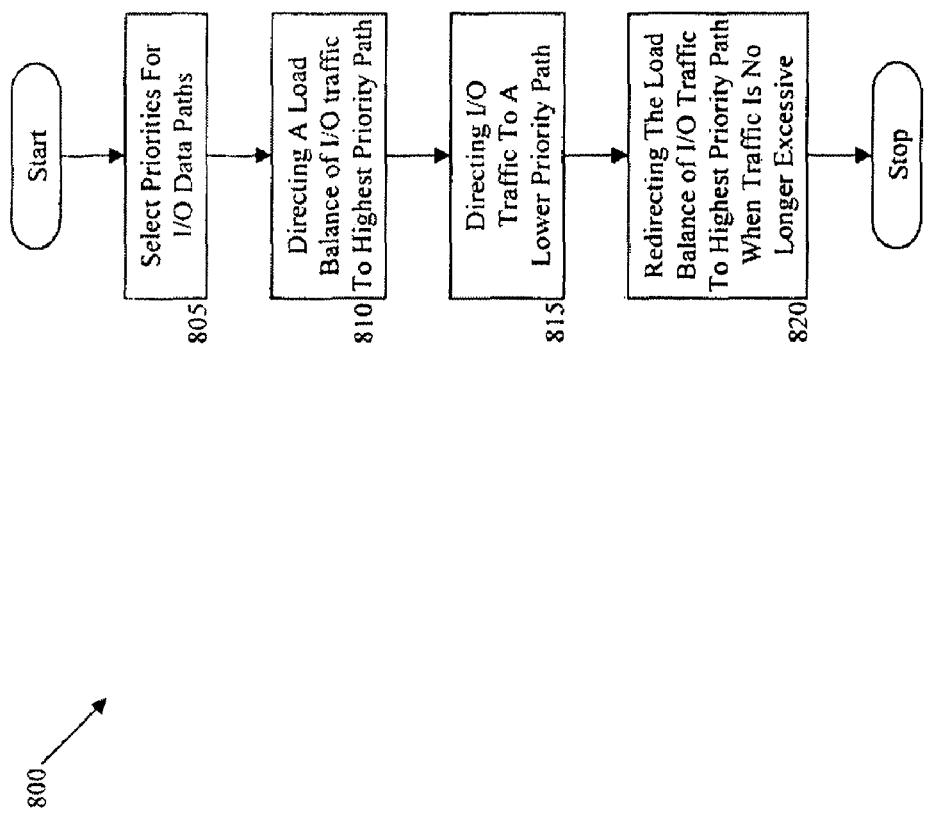

METHODS, SYSTEMS AND COMPUTER PRODUCTS FOR USER-MANAGED MULTI-PATH PERFORMANCE IN BALANCED OR UNBALANCED FABRIC CONFIGURATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to storage network systems, and particularly to user-managed multi-path performance in balanced or unbalanced fabric configurations.

2. Description of Background

Currently, component performance variants and characteristics, scalability issues and high availability of storage area network (SAN) environments present challenges to system administrators. Performance variants include adapter, switch port and host processor speeds. Performance variants can also be caused by the configuration design, where the number of hops in the I/O path is unequal. As the result of performance skew, the user could have an unbalanced SAN, which causes load balance problems for the host multi-path software. Currently there exists a need for methods, systems and computer products that provide the ability of concentrating all the I/O to the most efficient paths, such as those that are connected to their adapters or switches with the best performance and leave the less efficient hardware for failover purpose only, to utilize the hardware resources and achieve high availability.

SUMMARY OF THE INVENTION

Exemplary embodiments include a path priority selection method, including selecting a first I/O data path to be a highest priority path in a storage area network system, selecting a second I/O data path to be a low priority path, selecting an I/O threshold value, the I/O threshold value indicating that I/O data load is excessive, directing the load balance of I/O traffic to the first I/O data path, thereby placing the second I/O data path in a standby state, monitoring the first I/O data path, determining if the first I/O data path has reached the threshold value and performing a controlled failover of the first I/O data path to the second I/O data path when an I/O data load on the first data path has reached the threshold value.

Exemplary embodiments further include a path priority selection method, including selecting priorities for paths in a storage area network, wherein at least one of a path and a group of paths to hardware components of the storage area network, have a priority level assignment, directing a load I/O balance of the storage area network to a path having a highest priority and selecting a path for an I/O load based on a path selection algorithm when more than one path has a highest priority, the path selection algorithm including at least one of load-balancing and round-robin.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which enables user-managed path performance in balanced or unbalanced fabric configurations.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1-7 illustrate block diagrams of SAN systems in accordance with exemplary embodiments; and FIG. 8 is a flowchart for a method of user-managed path performance in balanced or unbalanced fabric configurations in accordance with exemplary embodiments.

The detailed description explains the preferred embodiments of the invention, together with advantages and features, by way of example with reference to the drawings.

DETAILED DESCRIPTION OF THE INVENTION

Exemplary embodiments include systems, methods and computer products for path selection that creates a priority scheme where each path or all groups of paths to certain hardware components, such as a host bus adapter (HBA) (an interface card that connects a host bus, such as a peripheral component interconnect (PCI) bus, to the SAN), has a priority level assignment. In exemplary embodiments, the load balance of path selection is biased toward the priority level. All paths have the same default priority level during the device configuration, but path priority level can be changed by a user interface. For example, a path priority level can be high, medium and low with the default to medium. The user can change the priority so high or low at any time. During the path selection for the next I/O candidate, the performance is given to a group of paths with the highest priority. If there is more than one path with the highest priority, these paths are selected for I/O with the path-selection algorithm that users specify, such as load balancing or sequential round robin. In exemplary embodiments, when a group of highest priority paths reaches a threshold value that is set by the user, a controlled failover is implemented. In exemplary embodiments, a user can set and retain their preferred path selection algorithm among the highest priority paths before and after a failover.

Figure 1:
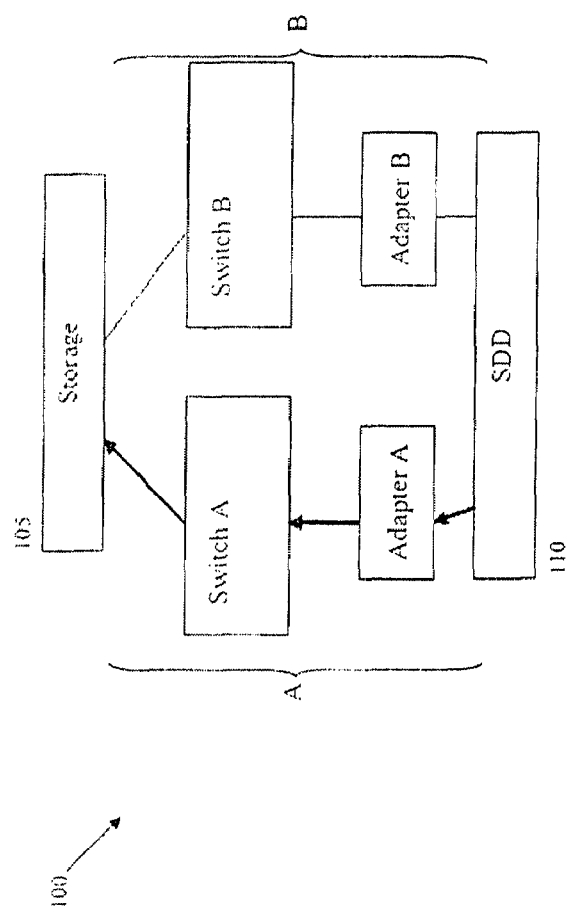

Turning now to the drawings in greater detail, FIG. 1 illustrates a block diagram of a SAN system 100 in accordance with exemplary embodiments. In exemplary embodiments, the system 100 can include a storage device 105 coupled to a Subsystem Device Driver (SDD) via data paths A, B. In exemplary embodiments, the SDD is a pseudo device driver designed to support the multi-path configuration environments such as system 100. The SDD can reside in a host system with a native disk device driver and provides functions including, but not limited to: enhanced data availability; dynamic I/O load-balancing across multiple paths; automatic path failover protection; concurrent download of licensed internal code; and path-selection policies for the host system. In the example illustrated, path A is identified as the best performance path from the SDD 110 to adapter A and performance switch A to the storage device 105. Furthermore, path B is identified as the path with inferior performance (i.e., without the best performance as compared to path A) from the SDD 110 to adapter B and performance switch B to the storage device 105. As such, path A is the more efficient path of the two paths A, B. Nonetheless, even in a balanced SAN configuration, the user may want to dedicate a storage port to one host to a more important application and let the other hosts to share another storage port.

Figure 2:
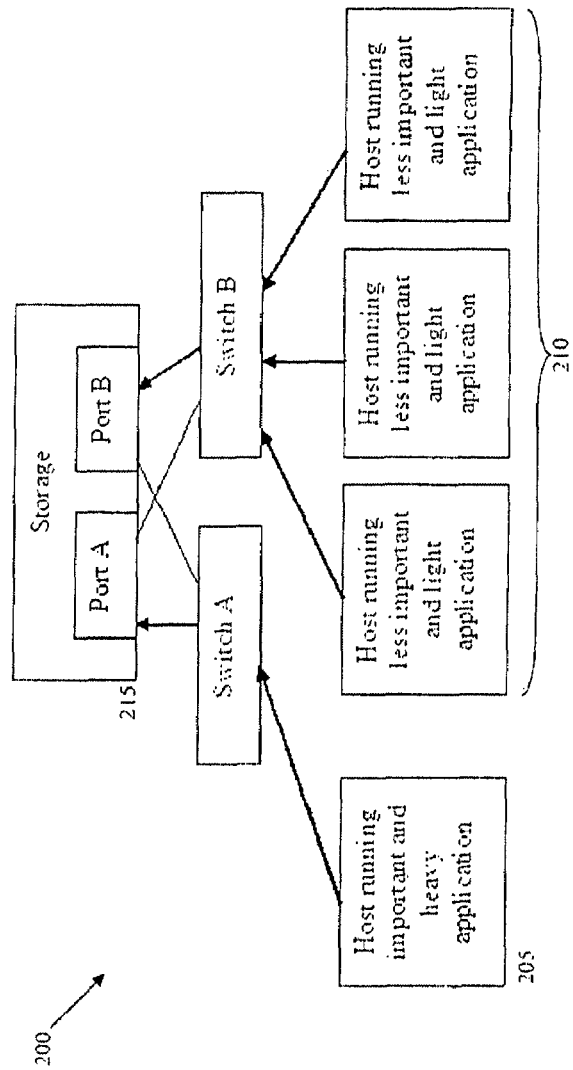

FIG. 2 illustrates a block diagram of a SAN system 200 illustrating preferred user paths in accordance with exemplary embodiments. A first host 205 is running a user identified important application with heavy path traffic, and is routed through switch A to port A on a storage device 215. A set of hosts 210 is running user identified less important applications with light traffic. All of the hosts in the set of hosts 210 are routed through switch B to port B on storage device 215. Currently, administrators usually achieve a similar configuration by switch zoning. To enforce this configuration dynamically at the multi-path device driver level, administrators can force I/O routing by setting the less efficient paths to OFFLINE or dynamically remove those paths. Both current approaches do not allow them to keep the less efficient paths as an alternative for failover purpose (i.e. as a backup). Furthermore, some multi-path device drivers may appear to offer the path priority capability, but they usually limit the path selection algorithm to failover only. As such, they limit users to run I/O only to one active path. Until an error condition happens, all the other paths configured remain idle. This approach does not give users the flexibility to failover from a group of paths to another group of paths. Furthermore, it does not allow user to run the path selection algorithms such as load balancing or sequential round robin that are proven to give best optimized performance for certain applications, in accordance with exemplary embodiments. As discussed further herein, priorities can be assigned to each path, thereby increasing the overall performance of the system 200.

It is appreciated that any SAN fabric environment, such as systems 100, 200 described above, can be unbalanced due to various reasons, mainly due to various hardware components or the load applied by certain hosts on a section of the fabric. For example, as the technology improves, an improved HBA may run much more efficiently than an older HBA in a SAN environment, thereby creating imbalances within the environment.

FIG. 3 illustrates a block diagram of a SAN system 300 in accordance with exemplary embodiments. As illustrated, a host 305 having a multi-path device driver such as a SDD, and two HBAs HBA-A, HBA-B is coupled to a storage device 310 via respective data ports P1, P2, through respective switches A, B.

The system 300 can be imbalanced as discussed above. For example, Switch A can have a faster speed (4 GBs) compared to switch B (2 GBs). Thus, the paths through switch A have better performance than the paths through switch B. Furthermore, HBA-A can be faster than HBA-B, thus I/O moving through HBA-B is slower than that I/O moving through HBA-A. In addition, the storage port P1 can be configured to be faster than the storage port P2, and I/O going to the storage port P2 is slower than I/O going to the storage port P1. In exemplary embodiments, I/O can be routed to the faster path defined by the respective HBA, switch, and port in order to maximize the performance of the system 300. As discussed, using the current available techniques, the storage administrator can put the slower paths to OFFLINE state, thus only faster paths are used. However, if there is an error situation on the faster paths, there is no alternate path to carry the I/O and the operation fails. In exemplary embodiments, a path of a group of paths of the slower hardware components instead of being placed OFFLINE are put to a lower priority. Therefore, all the paths (regardless of its priority) remain enabled/opened. Paths with lower priority are still available to carry the I/O simultaneously, during error scenarios, but by default all the I/O is carried by the faster paths. The slower paths are the stand-by paths.

FIGS. 4 and 5 illustrate block diagram of a SAN systems 400, 500 in accordance with exemplary embodiments. Referring to FIG. 4, in which two hosts Host A and Host B are connected to the same storage device 405, it is appreciated that for a variety of reasons known to those skilled in the art, if load from Host A is increased, then that has a negative effect on the performance of Host B and vice-versa. Referring to FIG. 5, in which one host 505 is connected to multiple storage devices, such as storage A and storage B, it is appreciated that for a variety of reasons known to those skilled in the art, the I/O load directed to storage A increases, the performance of the I/O going to storage B decreases, and vice-versa. As such, in the systems 400, 500, changes in the load in one section of SAN environment affects the performance of the other section of the SAN environment. As discussed, current solutions to this problem implement zoning techniques to isolate those SAN zones. As further discussed, the problem with this technique is that the number of the available paths decreases and there are not enough paths for failover. In exemplary embodiments, different sections of SAN are assigned to different priorities, with respect to different host\storage. For example, referring to FIG. 4, paths from host A to storage through switch A are given higher priority while paths through switch B are given lower priority. Similarly, for host B, paths through switch B have higher priority than switch A. Thus, the setup dynamically controls how the I/O is carried through the SAN, in order to maintain the performance of all components.

Figure 6:
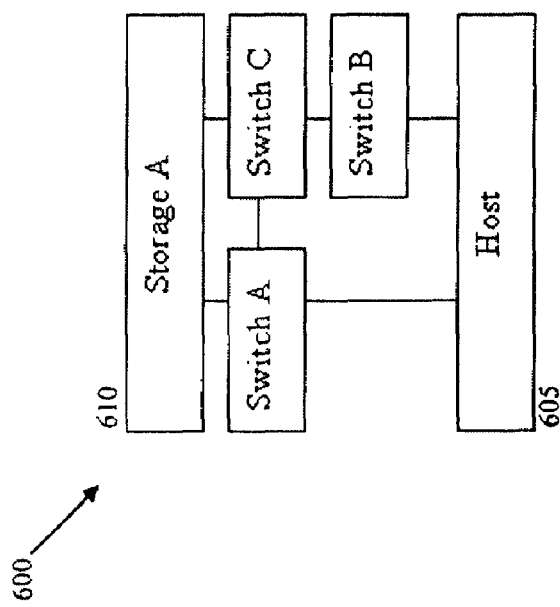

FIG. 6 illustrates a block diagram of a SAN system 600 in accordance with exemplary embodiments. The system 600 illustrates sections of SAN that includes several hops for the I/O to reach its destination. In exemplary embodiments, a hop is one segment of a transmission path between adjacent nodes in a routed network. The system 600 includes a host 605 coupled to a storage device 610 via multiple switches, switch A, switch B, switch C. The performance for I/O going between the host 605 and the storage device 610 through switch A is generally better than of the performance of I/O going through switch B and subsequently through switch C, because the number of hops required affects the performance of the data transfer. Currently, the solution is to remove switch C and make the number of hops same on all paths. However, this solution does not take into account that the multiple switch configurations may be designed by the customer for a specific reason. In exemplary embodiments, by assigning a higher priority to the paths through switch A, all the I/O is routed through switch A, while paths through switch B and switch C are used as backup paths.

In exemplary embodiments, in addition to enabling users to define the priority of a path or a group of paths, users are also able to utilize the hardware resources to optimize the performance by defining several settings. In exemplary embodiments, a first setting is an I/O load threshold value to trigger a controlled failover from the highest priority path(s) to the next priority path(s). As such, the failover process is taken place when the outstanding I/O exceeds the user defined threshold. This option provides the I/O overload relief from the high priority paths by temporarily failover to the low priority paths and automatic failback when the outstanding I/O is no longer excessive. Another setting includes path-selection algorithms that the users want to enforce to a group of paths.

In exemplary embodiments, improved path selection design creates a priority scheme where each path or all a group of paths to hardware components of the SAN has a priority level assignment. The load balance of path selection is biased toward the priority level. All paths have the same default priority level during the device configuration, and the path priority level can be changed by the user interface. For example, a path priority level can be high, medium and low with the default to medium. The user can change it to high or low at any time. During the path selection for the next I/O candidate, the preference is given to a group of paths with the highest priority. If there is more than one path with the highest priority, these paths are selected for I/O with the path-selection algorithm that users specify, such as load balancing or sequential round robin. In exemplary embodiments, when all paths of the same group have failed, the preference is then given to the group with the next priority level. This scheme is a failover process controlled by the priority level.

Figure 7:
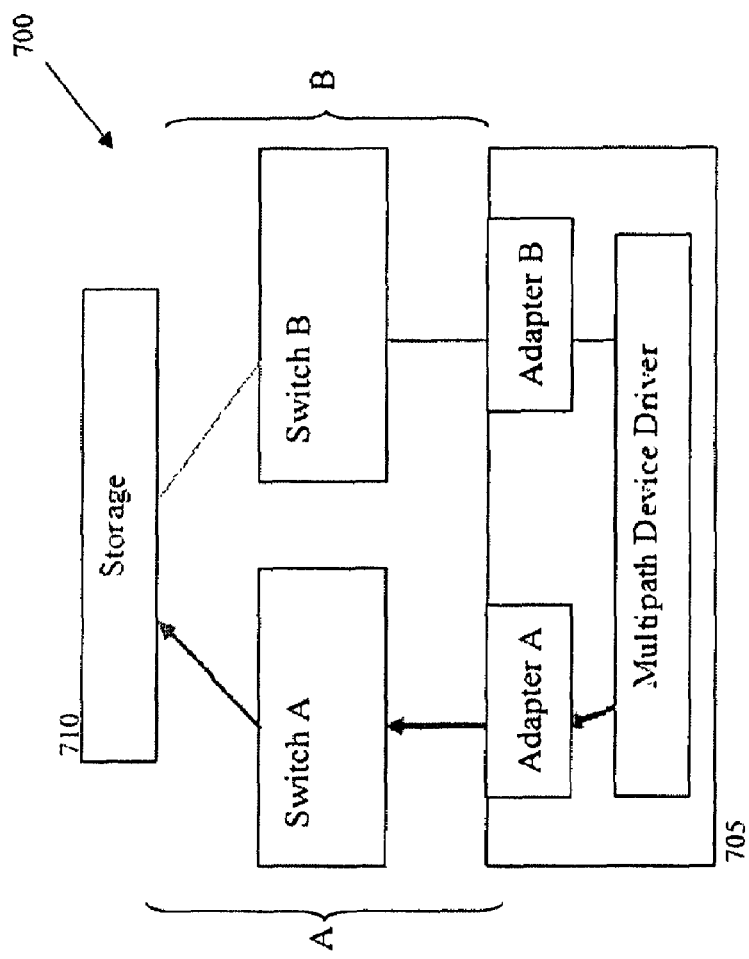

FIG. 7 illustrates a block diagram of a SAN system 700 in accordance with exemplary embodiments. Similar to the systems described above, system 700 includes a host 705 coupled to a storage device via a switch A having better performance as compared to a switch B. The host 705 includes a multi-path device driver as discussed above and two adapters A, B. After the user has selected the priority assignment, the path selection is biased toward the path A, which is more the efficient path as shown in as discussed above with respect to FIG. 1. As such, path B operates as a backup path. In addition to the failover caused by the hardware failures, a controlled failover from the highest priority path/group of paths to the ones with lower priority could also be triggered by an I/O overload threshold defined by the user. An example of a user setting is the queue depth value. When the outstanding I/O on the highest priority paths exceeds the queue depth value, the I/O requests are redirected to the lower priority paths.

FIG. 8 is a flowchart for a method 800 of user-managed multi-path performance in balanced or unbalanced fabric configurations in accordance with exemplary embodiments. The method 800 illustrates an overall flow of the exemplary embodiments described herein. At step 805, the user selects priorities for the I/O data paths. As discussed above, the default priorities can all be equal, such as medium. Other priorities can include highest and lowest. When the highest priority path is identified, all I/O traffic can be directed to the highest priority path at step 810. At step 815, all I/O traffic can be directed to a lower priority path, such as when the I/O traffic has reached a user-defined threshold. It is further appreciated that traffic can be re-routed according to user-defined path-selection algorithms as described herein. At step 826, the I/O traffic can be redirected to the highest priority path when the I/O traffic is no longer excessive.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A path priority selection method, comprising:
    directing, in a storage area network system, all I/O traffic among a first I/O data path, and a second I/O data path, both the first and second I/O data paths have a default medium priority, wherein the default medium priority is between a highest priority and a lowest priority;
    selecting the first I/O data path to be a highest priority path, wherein all I/O traffic is biased to the highest priority path;
    selecting the second I/O data path to be a low priority path, in which no I/O traffic is directed with an availability of the highest priority path to receive all of the I/O traffic;
    selecting an I/O threshold value, the I/O threshold value indicating that I/O data load is excessive;
    directing the load balance of I/O traffic to the first I/O data path, thereby placing the second I/O data path in a standby state;
    monitoring the first I/O data path;
    determining if the first I/O data path has reached the threshold value; and
    performing a controlled failover of the first I/O data path to the second I/O data path when an I/O data load on the first data path has reached the threshold value,
    wherein the first I/O data path has a faster speed than the second I/O data path, and wherein the second I/O data path remains online when the second I/O data path does not have any I/O traffic directed to it.

2. The method as claimed in claim 1 further comprising routing the I/O data load from the second I/O data path to the first I/O data path when the I/O data load is no longer excessive.

3. The method as claimed in claim 2 wherein the I/O threshold value is a queue depth value.

4. The method as claimed in claim 3 wherein performing a controlled failover of the first I/O data path to the second I/O data path when an I/O data load on the first data path has reached the threshold value comprises:
    identifying an outstanding I/O on the first I/O data path exceeding the queue depth value; and
    redirecting I/O requests to the second I/O data path.

5. A path priority selection method, comprising:
    assigning a medium priority to paths in a storage area network, wherein the medium priority is between a highest priority and a lowest priority;
    selecting at least one of a high and a low priority for the paths in the storage area network;
    directing a load I/O balance of the storage area network to a path having the high priority; and selecting a path for an I/O load based on a path selection algorithm when more than one path has the high priority, the path selection algorithm including at least one of load-balancing and round-robin, wherein if there is only one path of the one or more paths having the high priority, all I/O traffic is biased to the only one high priority path, wherein the first I/O data path has a faster speed than the second I/O data path, and wherein the second I/O data path remains online when the second I/O data path does not have any I/O traffic directed to it.

6. The method as claimed in claim 5 further comprising performing a controlled failover from the at least one of the path and the groups of paths having the high priority assignment, to lower priority paths.

7. The method as claimed in claim 6 further comprising:
selecting all paths of the high priority for the I/O load;
selecting all paths of a next highest priority for the I/O load if all paths of the high priority have failed; and
selecting all paths of a lowest priority for the I/O load if all the paths of the next highest priority have failed.

8. A computer program product including a non-transitory computer readable medium storing instructions for causing a computer to implement a path priority selection method, the method comprising:
directing, in a storage area network system, all I/O traffic among a first I/O data path, and a second I/O data path, both the first and second I/O data paths have a default medium priority, wherein the default medium priority is between a highest priority and a lowest priority;
selecting the first I/O data path to be a highest priority path, wherein all I/O traffic is biased to the highest priority path;
selecting the second I/O data path to be a low priority path, in which no I/O traffic is directed with an availability of the highest priority path to receive all of the I/O traffic;
selecting an I/O threshold value, the I/O threshold value indicating that I/O data load is excessive;
directing the load balance of I/O traffic to the first I/O data path, thereby placing the second I/O data path in a standby state;
monitoring the first I/O data path;
determining if the first I/O data path has reached the threshold value; and
performing a controlled failover of the first I/O data path to the second I/O data path when an I/O data load on the first data path has reached the threshold value,
wherein the first I/O data path has a faster speed than the second I/O data path, and wherein the second I/O data path remains online when the second I/O data path does not have any I/O traffic directed to it.

9. The computer program product as claimed in claim 8 wherein the method further comprises routing the I/O data load from the second I/O data path to the first I/O data path when the I/O data load is no longer excessive.

10. The computer program product as claimed in claim 9 wherein the I/O threshold value is a queue depth value.

11. The computer program product as claimed in claim 10 wherein performing a controlled failover of the first I/O data path to the second I/O data path when an I/O data load on the first data path has reached the threshold value comprises:
identifying an outstanding I/O on the first I/O data path exceeding the queue depth value; and
redirecting I/O requests to the second I/O data path.

12. A path priority selection system, comprising:
a storage device;
a plurality of adapters;
a plurality of paths disposed between and communicatively coupling the storage device and the plurality of adapters, the plurality of paths having a default medium priority, wherein the default medium priority is between a highest priority and a lowest priority; and
a device driver configured to:
set a path priority among the plurality of paths, the path priority including at least one of a low priority and a high priority;
direct all I/O traffic among a first I/O data path of the plurality of paths, and a second I/O data path of the plurality of paths;
select the first I/O data path to be a highest priority path in, wherein all I/O traffic is biased to the highest priority path;
select the second I/O data path to be a low priority path, in which no I/O traffic is directed with an availability of the highest priority path to receive all of the I/O traffic;
select an I/O threshold value, the I/O threshold value indicating that an I/O data load is excessive;
direct the load balance of I/O traffic to the first I/O data path, thereby placing the second I/O data path in a standby state;
monitor the first I/O data path;
determine if the first I/O data path has reached the threshold value; and
perform a controlled failover of the first I/O data path to the second I/O data path when an I/O data load on the first data path has reached the threshold value.

13. The system as claimed in claim 12 wherein the first I/O data path has a faster speed than the second I/O data path, and wherein the second I/O data path remains online when the second I/O data path does not have any I/O traffic directed to it.

14. The system as claimed in claim 12 wherein the device driver is further configured to route the I/O data load from the second I/O data path to the first I/O data path when the I/O data load is no longer excessive.

15. The system as claimed in claim 13 wherein the I/O threshold value is a queue depth value.

16. The system as claimed in claim 15 wherein performing a controlled failover of the first I/O data path to the second I/O data path when an I/O data load on the first data path has reached the threshold value comprises:
identifying an outstanding I/O on the first I/O data path exceeding the queue depth value; and
redirecting I/O requests to the second I/O data path.

17. The system as claimed in claim 12 wherein the device driver is further configured to:
select at least one of a high and a low priority for the plurality of paths in the storage area network;
direct a load I/O balance of the storage area network to a path having the high priority; and
select a path for an I/O load based on a path selection algorithm when more than one path has the high, the path selection algorithm including at least one of load-balancing and round-robin.

18. The system as claimed in claim 17 wherein if there is only one path of the one or more paths having the high priority, all I/O traffic is biased to the only one high priority path.

19. The system as claimed in claim 18 wherein the first I/O data path has a faster speed than the second I/O data path, and wherein the second I/O data path remains online when the second I/O data path does not have any I/O traffic directed to it.

20. The system as claimed in claim 19 wherein the device driver is further configured to perform a controlled failover from the at least one of the path and the groups of paths having the high priority assignment, to lower priority paths.

21. The system as claimed in claim 20 wherein the device driver is further configured to:

select all paths of the high priority for the I/O load;

select all paths of a next highest priority for the I/O load if all paths of the high priority have failed; and select all paths of a lowest priority for the I/O load if all the paths of the next highest priority have failed.

* * * * *